Aug. 11, 1964  H. O. SMOOTZ  3,144,232
TORCH HOLDER
Filed May 31, 1963
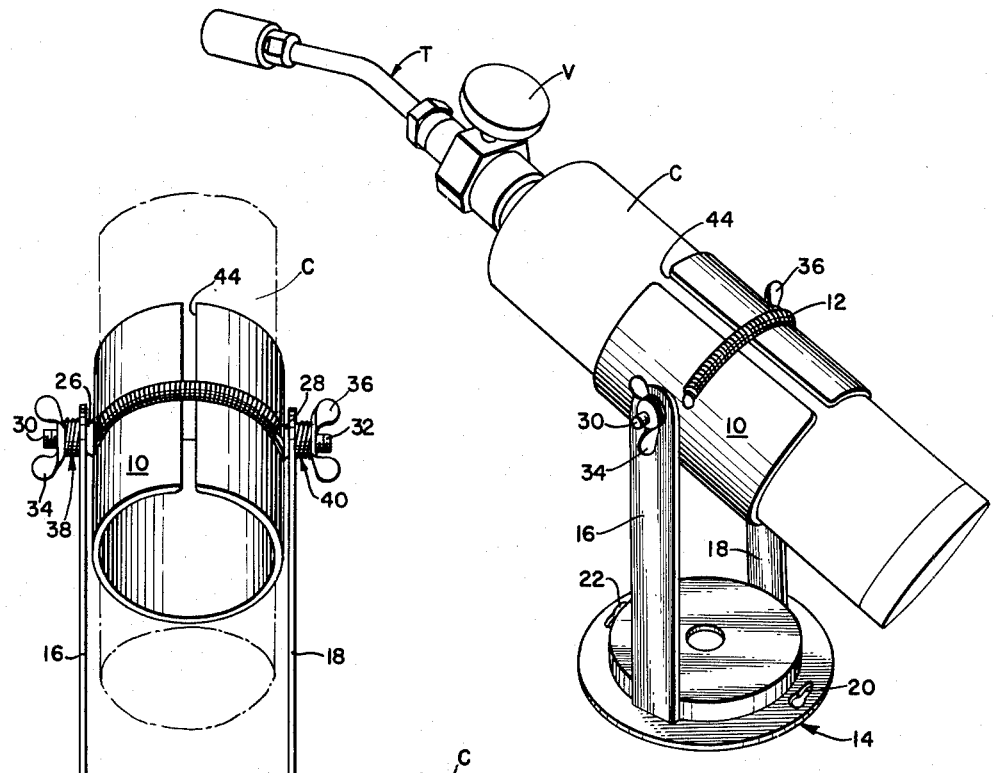
FIG. 1.
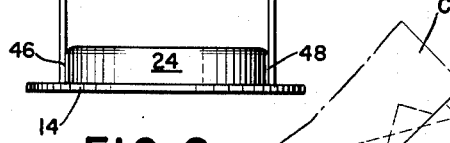
FIG. 2.
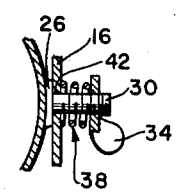
FIG. 4.
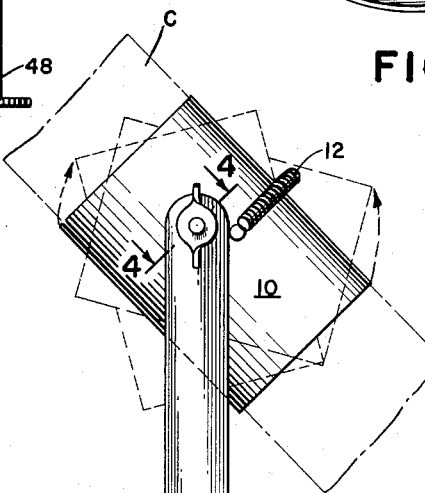
FIG. 3.
INVENTOR
Harry O. Smootz
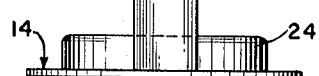

United States Patent Office 3,144,232
Patented Aug. 11, 1964

3,144,232
TORCH HOLDER
Harry O. Smootz, 326 E. Liberty St.,
Charles Town, W. Va.
Filed May 31, 1963, Ser. No. 284,490
5 Claims. (Cl. 248—141)

This invention relates to a torch holder, particularly for a torch of the type hereinafter described.

A torch of relevant type may comprise together with a torch nozzle and valve, a separable fuel tank or cylinder of a size adapted to be held in the hand. Torches of this type are used for various operations requiring local heating, such as soldering, removing paint or softening plastic tile. A fuel ordinarily supplied in the cylinders of torches of this type is propane.

While these torches are commonly held in the hand for most operations, they are somewhat bulky; moreover in directing the flame from the torch in any particular direction, the operator manifestly has only one hand free to manipulate the workpiece, iron, scraper or the like.

It is an object of the present invention to provide a torch holder that will firmly and securely support a torch in various positions.

It is a further object of the present invention to provide a torch holder which will permit orientation of the torch in a manner which will enable the operator to direct the flame in any desired working position.

It is a further object of the present invention to provide a holder which has a sufficiently firm gripping action on the torch to retain same in any position of adjustment, and at the same time to facilitate the longitudinal adjustment of the torch in the holder.

Other objects and advantages of the present invention will become evident during the course of the following disclosure.

In furtherance of the objects mentioned, a holder suitable for these purposes may consist essentially of a base portion, an upright fork-like means suitably affixed to the base, and a collar member supported rotatably by said uprights. The collar member, which may be of essentially cylindrical form and which conforms to the shape of the cylindrical fuel container, is releasably rotatable about an axis which will be usually horizontal and which passes diametrically through the collar member, is mounted in such a way to rotate to various angles with respect to the uprights and to the base, which latter elements are normally fixed with respect to each other. It is preferred to form the collar of thin flexible metal such as thin sheet metal, and to provide the collar with a slot or open portion running longitudinally thereof. The purpose of this slot is to supply the collar with such flexibility and variability in peripheral size as to conform to the size and shape of the fuel tank which the collar is adapted to grip.

In order to provide the collar member with a concentrically directed bias, an elastic member is stretched partway round the periphery of the collar member and across the slot therein. This elastic member preferably consists of a coil spring, and the latter will normally be under some tension when the cylinder is inserted in the collar, this tension being sufficient to provide a firm frictional grip on the cylinder. At the same time the force exerted by this spring is not sufficient to interfere with the manual adjustment of the fuel cylinder both longitudinally and rotatably about the axis of the fuel cylinder. The collar member is provided at diametrically opposed points thereon with swivels which are concentric with the axis of rotation of the suspended collar. In addition there is provided manually adjustable tension exerting or clamping means by which the collar may be secured in any given position. For this purpose the swivels may be threaded and supplied with an inter-engaging hand operated nut which will enable the operator to place as much frictional tension between the collar and the uprights as he may desire. It will be understood that any means that will force the uprights inwardly against the body of the collar will tend to fix the collar in any particular position.

A simple and effective support means may consist of two metal rods or bars having holes at their upper ends to receive the aforesaid swivel members and having their lower ends affixed by welding to the base member. The latter should have sufficient area to provide stability to the entire assembly. In the position in which the holder very largely will be used the base member will be supported on floor, step, workbench or the like. However, it is also contemplated that under some circumstances the user of the device may desire to suspend it in some other manner, and accordingly the base will be provided with openings, which will enable the same to be attached by screws or like means to a vertical wall surface.

Whereas the invention is pointed out with particularity in the subjoined claims, in order to provide for full understanding of the invention and the manner of construction and operation thereof, reference now will be had to a specific embodiment which has given particularly satisfactory results.

FIG. 1 is a perspective view of a torch holder with the torch in position.

FIG. 2 is an elevation of the device according to FIG. 1, the torch being indicated only by dotted lines.

FIG. 3 is a side elevation of the device according to FIGS. 1 and 2 showing, in dotted lines, the collar member as having been rotated into various positions.

FIG. 4 is a view in section taken along line 4—4 of FIG. 3.

In FIG. 1 the torch of conventional design is shown as consisting essentially of the nozzle portion T, the valve V and fuel cylinder C. This torch is supported as shown by means of the collar 10 which has a slot or opening 44 running longitudinally with respect thereto in such a manner as to cause the collar to be compressible inwardly so as to contact and hold the cylinder C. Assisting in the concentric gripping action of collar 10 is spring 12 which is affixed to the collar at two points on the periphery thereof, and which extends bridgewise over slot 44. The base member 14 is in the form of a circular plate or ring having a raised portion 24 which forms a flat cylinder concentric with the axis of the base. Affixed to the walls of raised portion 24 at points 46 and 48 by welding or other suitable means are two uprights 16 and 18 having at the upper end of each a hole adapted to receive a pivot as most clearly shown in FIG. 4. In the latter figure the pivot 30 extends through hole 42 in upright 16 and on the opposite side of the upright is integral with the pivot and there expands into a boss 26 of somewhat larger dimensions. The boss 26 is integral with the walls of the collar. The pivot 30 is threaded so as to receive the internal threads of a butterfly nut 34. It will thus be understood that as nut 34 is tightened, the frictional contact between boss 26 and the surface of upright 16 will be increased to any desired degree. It has been found desirable to provide a compression coil spring 38 as shown in FIG. 4 between the nut 34 and the upright 16 so that the frictional pressure exerted can be continuously regulated. The base may be provided as shown in FIG. 1 with two holes 20 and 22 for fastening the base to a vertical wall, or if desired to a flat horizontal surface.

The operation of the device will thus be evident; when the cylinder of the torch is placed in the collar and is slid into position therein, normally to an extent sufficient, when the nozzle is attached to the cylinder, to approximately bring the center of gravity to the axis of the pivots 30 and 32. Having then rotated the collar and the torch until it tilts in the desired position (FIG. 3), the butterfly nuts 34 and 36 are tightened sufficiently to clamp the device in the selected position. The torch also manifestly may be rotated on its axis and the base may be turned so that the torch to all intents and purposes has universal orientation and may be brought as near to the workpiece as desired and in the position deemed most suitable.

Modifications of the present invention will suggest themselves to those skilled in the art.

I claim:

1. A torch holder for torches having fuel-containing cylinders, said holder comprising a base member, arms fixed to said base member, a collar rotatably mounted between said arms, said collar being in the form of a thin-walled cylinder with open ends and with a split running through the wall of said collar from one end thereof to the other, the axis of rotation of said collar passing substantially diametrically therethrough and extending through said arms, an elastic tension member partially encircling said collar and exerting thereon a substantially constant force tending to bring together the edges of said split, and means for selectively exerting a variable force augmenting said constant force, said means also selectively exerting a variable frictional force between said arms and said collar.

2. A torch holder according to claim 1 wherein said means for selectively exerting variable forces comprises at least one threaded pivot having its axis substantially coincident with the axis of rotation of said collar and a manually operable nut cooperating with said threaded pivot.

3. A torch holder according to claim 1 wherein said means for selectively exerting variable forces comprises at least one threaded pivot having its axis coincident with the axis of rotation of said collar, a manually operable nut cooperating with said threaded pivot, and a coil spring member located between said nut and one of said arms.

4. A torch holder according to claim 1 wherein said means for selectively exerting variable forces comprises pivot members, said pivot members being fixed to the wall of said collar and passing through openings in said arms.

5. A torch holder for torches having fuel-containing cylinders, said holder comprising a base member, arms fixed to said base member, a collar rotatably mounted between said arms, said collar being in the form of a thin-walled cylinder with open ends and with a split running through the wall of said collar from one end thereof to the other, the axis of rotation of said collar passing substantially diametrically therethrough, pivots coaxially located with respect to said axis of rotation, said pivots being fixed to said collar and each extending through openings in said arms, an elastic tension member attached to said collar and bridging the gap formed by said split therein, at least one of said pivots being threaded to receive a manually operable nut cooperating therewith.

References Cited in the file of this patent

UNITED STATES PATENTS

| | | |
|---|---|---|
| 1,474,593 | Jennings | Nov. 20, 1923 |
| 2,470,154 | Fitzgerald | May 17, 1949 |
| 2,552,844 | Clinehens | May 15, 1951 |